Dec. 26, 1961
W. K. JANSEN
3,014,766
TRACK FRAME REINFORCEMENT
Filed April 24, 1959
2 Sheets-Sheet 1
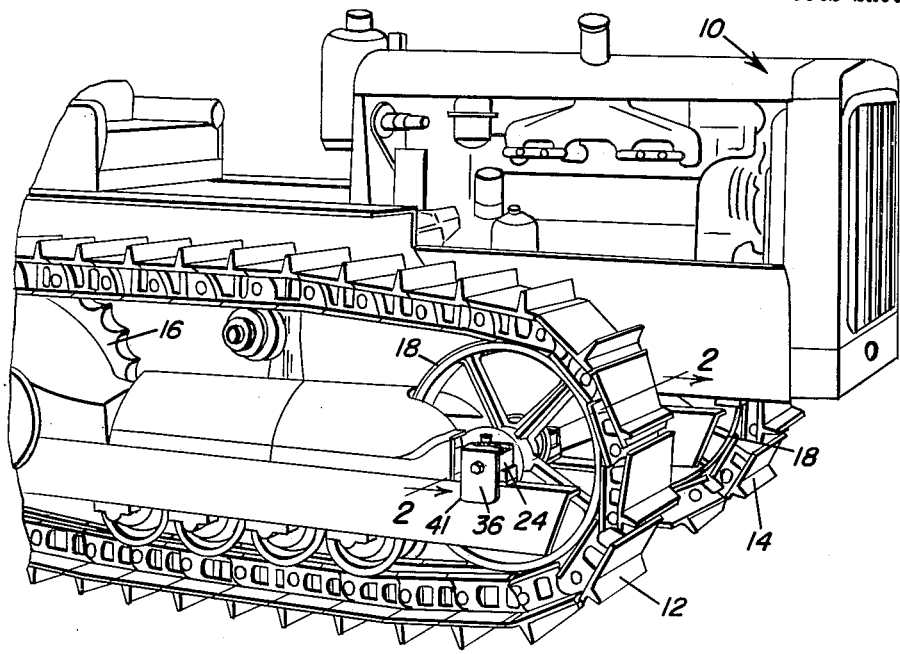
Fig. 1
Fig. 3
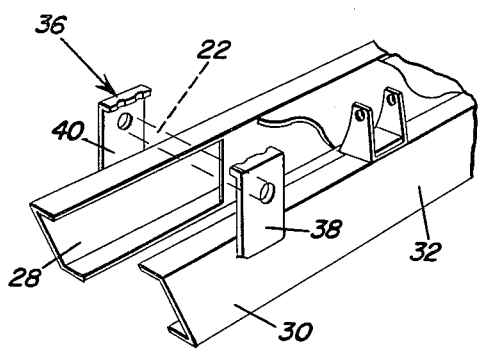
Ward K. Jansen
INVENTOR.
BY *Clarence A. O'Brien*
*and Harvey B. Jacobson*
Attorneys Dec. 26, 1961

W. K. JANSEN 3,014,766

TRACK FRAME REINFORCEMENT

Filed April 24, 1959

Ward K. Jansen
INVENTOR.

BY *Clarence A. O'Brien*
and *Harvey B. Jacobson*
Attorneys

United States Patent Office 3,014,766
Patented Dec. 26, 1961

3,014,766
TRACK FRAME REINFORCEMENT
Ward K. Jansen, % Jansen Lumber Mill, Stone Ridge, N.Y., assignor of forty percent to Philip Korn, Kerhonkson, N.Y.
Filed Apr. 24, 1959, Ser. No. 808,595
2 Claims. (Cl. 308—18)

This invention relates to improvements in the frame construction of tractors and more particularly to a device to overcome a serious problem in the construction of tractors.

An object of the invention is to provide means for overcoming a present difficulty in the track frame of a tractor at a point where the frame is subject to bending and distortion.

In tractors of the type using endless webs for the support thereof and for the propulsion thereof, there are front idler axles on which a pair of idler wheels are mounted for rotation. The tracks extend around these idler wheels and also around the drive sprocket wheels at the rear part of the tractor. Each idler axle is ordinarily supported on a bearing at each end, and the bearings are attached to the frame. The attachment which exemplifies this invention strengthens the frame at the point thereof which ordinarily bends or otherwise fails, usually by spreading the sides of the frame. The attachment is very simple in construction but serves a very important purpose and in what is considered to be a unique manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional tractor equipped with an attachment in accordance with the invention.

FIGURE 3 is a fragmentary perspective view of a part of the track frame equipped with an attachment for one idler wheel and one axle of the tractor in FIGURE 1.

Figures 2, 4:
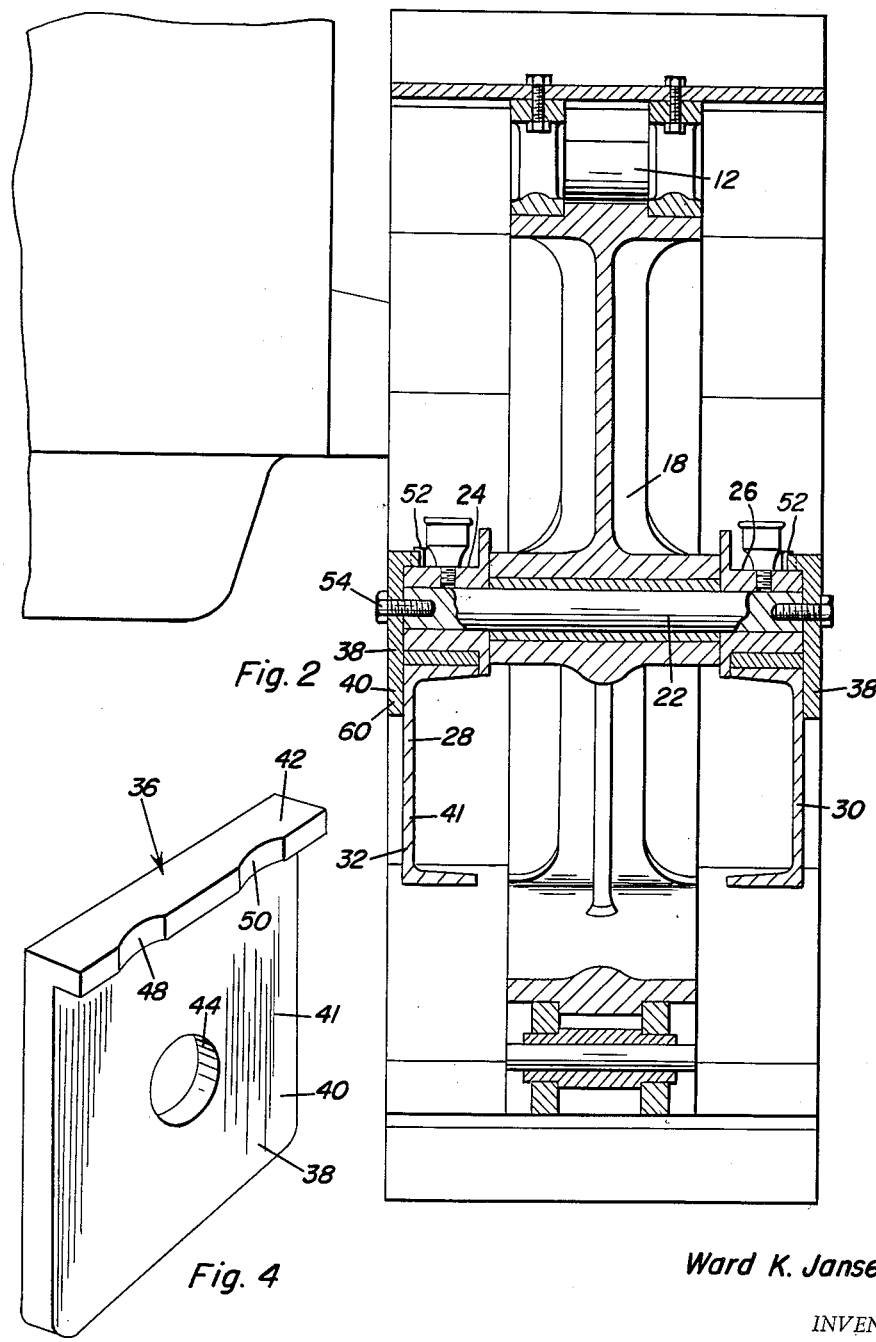
FIGURE 2 is an enlarged fragmentary sectional view taken approximately on the line 2—2 of FIGURE 1.
FIGURE 4 is a perspective view of one of the attachments.

In the accompanying drawings there is a conventional tractor 10. This tractor diagrammatically represents any manufacturer's make and style of tractor which is subject to the same difficulty. Tractor 10 has two endless webs forming tracks 12 and 14, and they are driven from the rear by means of drive sprocket wheels 16. There are front idler wheels 18, one such wheel for each track, and the idler wheels are individually mounted for free turning on axles. A typical wheel 18 is shown in FIGURE 2, this wheel being mounted for free rotation on axle 22. The axle is mounted at its ends in supporting sleeves 24 and 26, and each supporting sleeve is secured to its side 28 and 30 of frame 32. The outer end of frame 32 is a point of weakness because the sides 28 and 30 tend to spread over extended periods of normal use.

Attachment 36 consists of a pair of supporting brackets 38 and 40 which are identical and interchangeable. Typical bracket 38 is made of a rectangular plate 41 having a right angular flange 42 at its upper edge. There is an aperture 44 in plate 41, and for one particular type of tractor bearing 24, flange 42 has a pair of recesses 48 and 50 opening through the inner edge thereof to accommodate cap screws 52 of the bearing 24.

Both ends of axle 22 are bored and tapped to receive bolts 54. The bolt extends through aperture 44 with the head of the bolt bearing against the outside surface of plate 41. Flange 42 fits flush over the top of supporting sleeves 24 and is anchored by means of a crotch formed at the right angular juncture of flange 42 and the inner surface of plate 41. Plate 41 is made sufficiently long to have a lower lip 60 which fits flush against the outside surface of frame side 28. The lip 60 prevents the frame side 28 from extending or deflecting outwardly. As shown in FIGURE 2 the two identical brackets are engaged with the same axle 22 and bear against the outside surfaces of the two sides 28 and 30 of frame 32. This completes the assembly for idler wheel 18. The assembly for the other idler wheel is identical. It is evident from an inspection of FIGURE 2 that the axle 22 not only serves as a spindle about which wheel 18 rotates but also assumes a new nature that is, of a transverse brace for preventing spreading of the sides 28 and 30 of the frame member 32. Accordingly, it becomes a structural support for the frame as well as something on which the idler wheel 18 may rotate.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a tractor of the type comprising a track frame including a pair of spaced, parallel channel bars, transversely aligned supporting sleeves mounted on said bars and including flat tops, cap screws securing said supporting sleeves on the bars, an axle mounted in the sleeves and an idler wheel journaled on said axle, a pair of flat, vertical plates, means securing said plates on the axle in abutting engagement with the ends thereof, said plates including lower portions in face-abutting engagement with the webs of the channel bars, for positively retaining same against spreading, and inwardly right angularly extending flanges integral with the upper portions of the plates seated on said flat top portions of the sleeves for positively retaining said plates against turning on the axle and having recesses in the free longitudinal edges thereof receiving the cap screws.

2. For use on a tractor of the type comprising a track frame including a pair of spaced, parallel channel bars, transversely aligned supporting sleeves mounted on said bars and including flat tops, cap screws securing said supporting sleeves on the bars, an axle mounted in the sleeves and an idler wheel journaled on said axle, a pair of flat, vertical plates, means securing said plates on the axle in abutting engagement with the ends thereof, said plates including lower portions in face-abutting engagement with the webs of the channel bars, for positively retaining same against spreading, and inwardly right angularly extending flanges integral with the upper portions of the plates seated on said flat top portions of the sleeves for positively retaining said plates against turning on the axle and having recesses in the free longitudinal edges thereof receiving the cap screws, said plates having openings therein aligned with the axle, said securing means comprising bolts engaged in the openings and threaded into the end portions of the axle.

References Cited in the file of this patent
UNITED STATES PATENTS

| | | |
|---|---|---|
| 1,642,979 | Timbs et al. | Sept. 20, 1927 |
| 1,930,626 | Schwemlein | Oct. 17, 1933 |
| 2,290,883 | Knox | July 28, 1942 |
| 2,512,148 | Gaines | June 20, 1950 |